3,045,223
DEVICE FOR DETECTING THE PRESENCE OF FOREIGN MATERIAL
Narinder S. Kapany and Donald A. Pontarelli, Chicago, and Phillip J. Joseph, Franklin Park, Ill., assignors, by direct and mesne assignments, to Chicago Aerial Industries, Inc., Melrose Park, Ill., a corporation of Delaware
Filed July 8, 1959, Ser. No. 825,712
10 Claims. (Cl. 340—234)

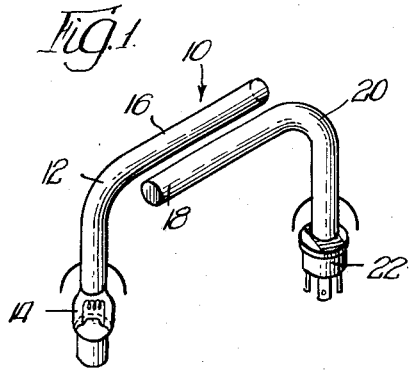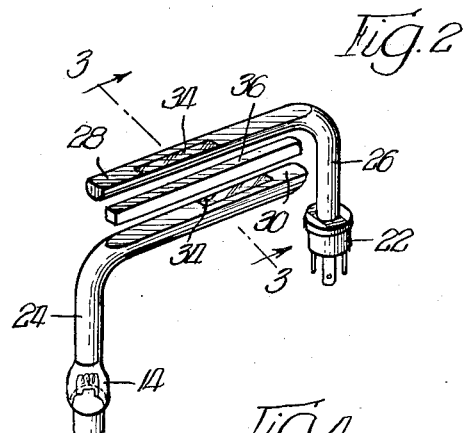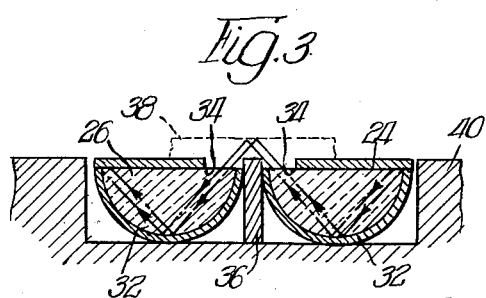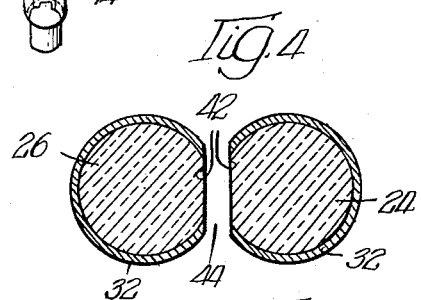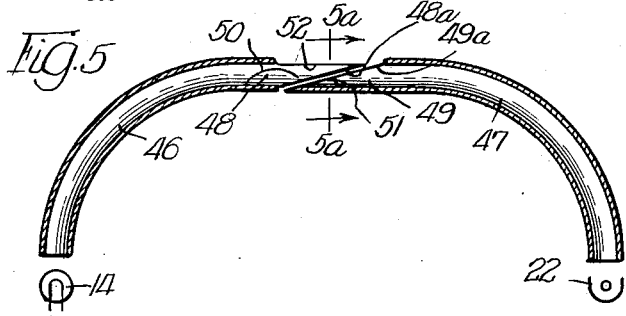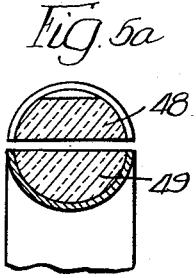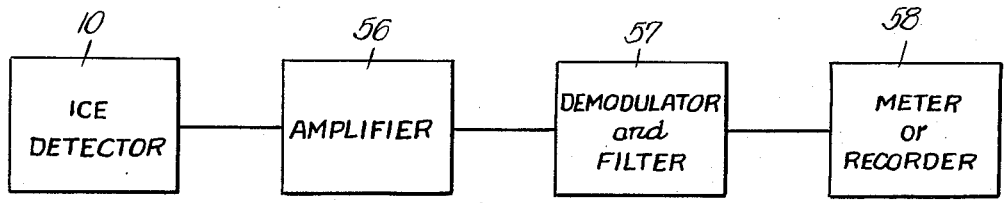

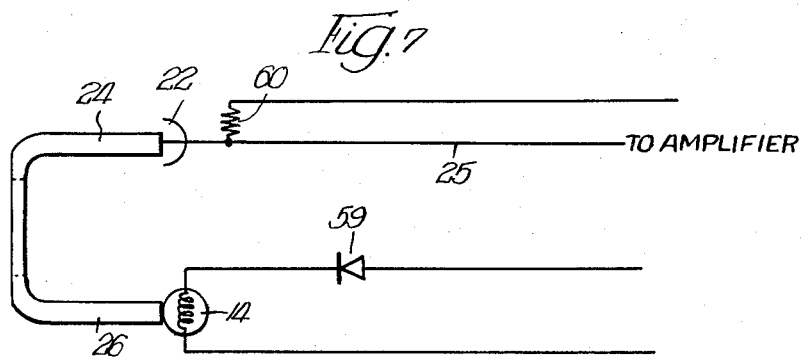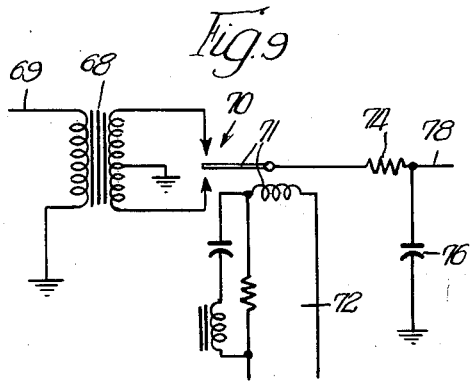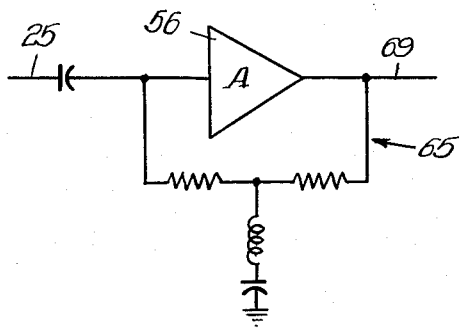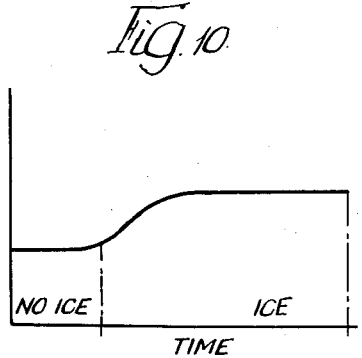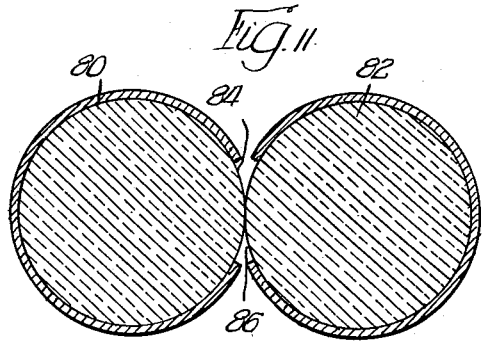

This invention relates to means for detecting the presence of numerous types of light conducting and non-conducting substances, including substances which have the properties of refracting and scattering, and is especially suited for detecting the presence of substances such as ice and water in the form of coatings and films on aircraft structural members.

One of the problems encountered in the operation of aircraft is the formation of ice on the structural members, particularly the wings. It is common knowledge that ice can be extremely dangerous in this respect and has been the direct cause of numerous aircraft accidents. For this reason various devices have been designed and invented in the past for the detection of ice and for its removal. For the most part these devices are effective in accomplishing the purposes for which they were intended.

It has been found, however, with the advances in aircraft technology, particularly relative to increases in speed, that substantially all of the prior art devices have a common failing. The increases in speed demand that there be no interference with the streamlines of the aircraft. The prior art devices are generally of such a nature that they must protrude beyond the structural surfaces with which they are associated. Accordingly, the prior art devices are not well suited for use with modern day aircraft since they cannot meet the aforementioned aerodynamic requirements.

For the above reason, among others, it has been necessary to invent an ice detecting system which especially lends itself for use with high speed aircraft. In particular, the subject invention may be readily designed to have a profile that may blend with the surface with which it is associated.

A still further consideration in approaching the problem of ice detection in aircraft is in distinguishing between ice and water. Many of the prior art devices cannot accurately make this distinction and consequently often give a false warning for ice when the surface is merely wetted. The subject invention is designed so that it is particularly suited for detecting ice and distinguishing it from a film of water which would ordinarily tend to give a signal.

The invention may be briefly described as including two light conveying bodies which are juxtaposed for at least a portion of their length and are mounted in a closely spaced relationship. The first of said bodies is connected to a light source and the second of said bodies is connected to a light sensing element. Both of the light conveying bodies are provided with a light refracting surface in which light may be refracted from the body to its surroundings or conversely from the surroundings into the body. Normally the second light conveying body, which is connected to the light sensing means, is substantially isolated from the first light conveying body with respect to the transmission of light, although this may not be the case in some instances.

When a light conducting media, such as ice, bridges the light conveying bodies, particularly the refracting surfaces, light is conveyed from the first light conveying body to the second light conveying body. The increased amount of light in the second body is sensed by the light sensing means and causes a signal to be received which would indicate the presence of the light conducting media. To prevent the presence of ambient light from affecting the output signal, the light source connected to the first light conveying body is preferably modulated at some predetermined frequency and the indicating circuitry of the invention is designed to be insensitive to direct current changes in the signal level.

A foremost feature and object of this invention resides in the provision of a system for detecting the presence of a light conducting or non-conducting substance.

A second feature and object of the invention resides in the provision of a system for detecting ice that is especially adapted to be used with high speed aircraft without interfering with the aerodynamic qualities of the structural member or surface with which it is associated.

Another feature and object of the invention resides in the provision of a system that accurately distinguishes between ice and water but by a simple adjustment may be used for the detection of both.

These and other features and objects of the invention may be seen upon reading of the specification with reference to the following drawings.

In the drawings:
FIGURE 1 is a perspective view of a simplified form of the invention.
FIGURE 2 is an exploded view of a preferred embodiment of the invention.
FIGURE 3 is a sectional view taken along the line 3—3 in FIGURE 2.
FIGURE 4 is a sectional view, similar to FIGURE 3, of a modified form of the invention.
FIGURE 5 is a front view in section of a modified form of the invention.
FIGURE 5a is a sectional view taken along the lines 5a—5a in FIGURE 5.
FIGURE 6 is a schematic illustration of one form of the system in which the device as shown in FIGURES 1–5 may be used.
FIGURE 7 is a diagrammatic illustration of the electrical circuitry which may be used in the construction of a system shown in FIGURE 6.
FIGURE 8 is a schematic view of one type of circuit that may be used in the construction of the amplifier shown in FIGURE 6.
FIGURE 9 is a diagrammatic illustration of one form of a demodulator that may be used in the construction of FIGURE 6.
FIGURE 10 is a graphical illustration of the signal received when the system is used for detecting ice.
FIGURE 11 is a sectional view of a modified form of the invention.

While this invention is especially suited for use with aircraft, it is to be understood that the invention has numerous other uses. For this reason the reference to aircraft is merely by way of example and is not to be construed as a limitation. As a matter of fact, it will be apparent that this invention has many applications in the fields of flow and process control.

Referring now to FIGURE 1, there is shown a perspective view of a simplified form of a means of detecting ice or other light conducting material. The ice detector is generally denoted by the numeral 10 and includes a first rod member 12, which may be constructed of a light conveying material, such as glass, plastic, and the like.

While the invention will be described in terms of the visible rays, it is contemplated that electro-magnetic radiation in the non-visible range may be used in the practice of the invention. If radiation in the non-visible range is used, such as infrared, then the rods may be opaque to the eye while being transparent to the rays.

Although the rods are shown to be of circular cross-section, it is to be understood that it is merely for purposes of illustration and that they may have other cross-sections. The rod 12 in this instance has been bent at substantially right angles intermediate its ends with one end being connected to a light source 14 of some suitable type. The portion 16 remote from the light source 14 is positioned in a closely spaced relationship with a portion 18 of a similar rod member 20 which is likewise bent at right angles intermediate its ends. The rod member 20 is connected at one end with a light sensing device 22, such as a lead sulphide photo-conductive cell. This type of cell is characterized as having a resistor element, the resistance of which varies in accordance with the amount of light received within the cell. Generally, an increase in intensity of the light causes a reduction in the resistance of the resistor member. It is apparent that other types of light sensing elements may be substituted for the photo-conductive cell, such as photo-electric cells, photon counters, thermopiles, or any other device suitable for detecting the radiation used.

One of the principles utilized in the subject invention is the conveying of light by a rod member such as those indicated in FIGURE 1. By conveying it is meant that the element not only permits the light to pass through it, but will actually direct it in a predetermined manner. For example, in FIGURE 1 it can be seen that the source of light is connected to a section of the rod 12 which is at right angles to the section 16. It has been found that the rod, notwithstanding the right angle bend, will convey at least a portion of the light to the right angle section 16. This phenomenon is the result of the principle that if a light ray strikes an interface between two media having different indices of refraction at greater than a certain angle, then at least part, if not all, of the light will be reflected rather than refracted. The angle at which reflection becomes complete is known as the critical angle and is a well known principle in the field of optics.

When light is emitted from the source 14, at least a portion of it enters the end of the rod 12 to which it is connected. According to the critical angle phenomenon, some of the light will be reflected so that it stays within the rod and some of it will be refracted out of the rod. The reflected light will continue along the rod until it again strikes the rod surface at which time it may be again reflected or refracted. Finally a portion of the light will reach the section 16 of the rod 12. The same phenomenon applies to light entering the rod 20 through its cylindrical walls. A portion of the light entering through the cylindrical walls will be conveyed by the rod to the light sensing element 22.

As the detector 10 is shown in FIGURE 1, very little of the light escaping from the rod 12 will normally impinge upon the rod 20 so as to be conveyed to the light sensing element 22. However, it is likely that a small amount of light may be conveyed by the rod 20 so that possibly there will always be a slight signal to indicate that the system is energized.

If the light conducting media such as ice or water were to bridge the rods 12 and 20, it will be seen hereinafter that a greater amount of light will be conveyed to the rod 20 resulting in an increased signal by the light sensing means 22. The increased signal will indicate the presence of a light conducting media.

While the system shown in FIGURE 1 may be utilized in certain instances, the preferred embodiment is shown in FIGURE 2 which provides a greater sensitivity for detecting the presence of a light conducting media.

The device shown in FIGURE 2 includes the rods 24 and 26 which are connected to the light source 14 and light sensing element 22, respectively. The rods 24 and 26 are constructed of a suitable light conducting material such as glass, and are provided with the flat surfaces 28 and 30. Both of the rods have been coated with a suitable light reflecting material such as silver or aluminum, as shown in FIGURE 3 in exaggerated form. In this instance the coating 32 extends over substantially all of both rods 24 and 26 except for the areas 34 as shown in the drawings. The purpose of the reflective coating is to eliminate the light losses due to refraction at points along the rod other than at a selected area which is to be utilized for the actual detection. In this manner it is possible to obtain a much more pronounced effect when the light is conveyed from the rod 24 to the rod 26. The light reflective material further minimizes the introduction of ambient light that might interfere with the operation of the system.

It can be seen in FIGURE 3 that the light reflected by the coating 32 out the opening 34 of the rod 24 will normally be directed away from the rod 26. Thus, the rod 26 is substantially isolated from the light rays reflected from the rod 24.

A barrier member 36 constructed of any suitable material is positioned between the rods 24 and 26. The barrier member 36 extends above the flat surface of each of the rods, as shown in FIGURE 3, which enables the detector to distinguish between ice and water. While the ice can bridge between the rods 24 and 26 notwithstanding the barrier 36, as indicated by the dotted lines in FIGURE 3, water cannot. In this manner the water cannot convey the light from the rod 24 to the rod 26 so as to give a false reading for ice. Where it is desired to detect both ice and water, the barrier 36 may be omitted or altered.

As was pointed out previously, the light rays refracted through the area 34 of the rod 24 would normally be directed away from the rod 26. However, it has been found that the ice 38 will direct at least a part if not all of the rays from one rod to the other. It is believed that the light conveying properties of the ice are due to at least two natural mechanisms. Firstly, if the ice is clear, the light striking the interface of the ice and air at greater than the critical angle, will be reflected into the rod 26 as explained previously. The reflected light will then be sensed by the light sensing means 22 and will thus indicate the presence of ice.

The second mechanism occurs when the ice is translucent rather than transparent, such as rime ice. In this instance it is believed that the diffusive or scattering powers of the ice will conduct at least a part of the light refracted from the rod 24 to rod 26. The increase in light in rod 26 will be sensed by the sensing element 22, as described previously.

Of course, in any particular situation the transmission of the light from one rod to the other may be the combination of diffusion and reflection.

In FIGURE 3 the cross-sections of the rods 24 and 26 are shown as being mounted in a fragmentary portion of a larger structural member 40. From this illustration it can be seen that the detector may be mounted in the structural element without protruding from the general profile of the latter. Thus the detector would not interfere with the aerodynamic performance of an aircraft structural element.

In FIGURE 4, there is shown a modification of the invention in which the flat surfaces 42 are in facing relationship. Thus, when ice bridges the gap 44, the light from rod 24 will be conveyed to rod 26 in the manner previously described. This modification is especially suited for detecting ice and water and other liquids and solids of similar nature.

In FIGURES 5 and 5a there is shown another modification of the subject invention consisting of the coated rods 46 and 47 which are connected to the light source 14 and the light sensing element 22, respectively. The rods 46 and 47 are mounted so that their respective end portions 48 and 49 are in a coaxial relationship. The ends of the portions 48 and 49 are cut at an angle with the angles 50 and 51 being supplementary, with the end surfaces 48a and 49a being in closely spaced relationship. The surface 48a is preferably cut at an angle so that substantially all of the light striking it is reflected rather than refracted out the end. The rod 46 in one preferred form has a flat uncoated surface 52 adjacent its end superimposed over the surface 48a. A large portion of the rays reflected from surface 48a will strike the surface 52 at an angle less than the critical angle and thus will be refracted out of the rod.

When the space between the surfaces 48a and 49a is filled with a substance having a different index of refraction than air or the ambient media, such as water or ice, then the critical angle will be changed so that at least a part of the rays are refracted out the surface 48a. If the media in the space is transparent to the rays, then they will pass directly into the rod 47. On the other hand, if the media is light diffusing in character, then the light will be diffused into the rod 47. In any event, the increased amount of light will be sensed by the element 22, thus indicating the presence of a different media.

In FIGURE 6 there is shown a diagrammatic illustration of one form of the system in which the rod members may be used. Specifically the system in this instance consists of the ice detector 10, an amplifier 56 for amplifying the signals received from the sensing means 22, a demodulator and filter 57 for removing undesirable portions of current from the amplifier, as will be explained more fully hereinafter, and a meter or recorder 58 for receiving and recording the demodulated signal. The circuitry of this system is shown in FIGURES 7, 8 and 9.

In FIGURE 7 there are shown the rod members 24 and 26 which are connected to a source of light 14 and a photo-conductive cell 22. In this instance the source of light 14 is connected to an alternating current which is passed through a half wave rectifier 59 of some suitable type.

The photo-conductive cell is biased in a conventional manner by an appropriate electrical potential so that the E.M.F. drop across the cell 22 and the resistor 60 is substantially in balance when there is no light, so that little or no signal is sent to the amplifier. As soon as the light is sensed by the element 22, its resistance is diminished so that there is a differential between the E.M.F. drops across the cell 22 and the resistor 60, resulting in a signal being transmitted to the amplifier 56.

An amplifier 56 of some conventional type is indicated in symbolic form in FIGURE 8 and is connected to the photo-conductor cell 22 by the lead 25. In one preferred form the amplifier 56 is coupled with a feedback loop, generally denoted by the numeral 65, which is designed to eliminate all of the direct current transients except the alternating current signal generated in the photo-conductive cell 22 in response to the modulated signal from the light 14.

FIGURE 9 illustrates one form of a demodulator and filter 57 especially suited for use in the construction of the subject ice detector. The demodulator 57 includes a center tap transformer 68 which is connected to the amplifier 56 by means of the line 69. The transformer 68 is in turn connected to the chopper circuit which is generally denoted by the numeral 70 and consists of the vibrator 71 and the phase shifter circuit 72. The vibrator 71 is in turn connected to the filter circuit consisting of the resistor 74 and the capacitor 76 to ground. The filter in turn is connected to the meter or recorder 58 by means of the line 78.

The meter or recorder 58 is of some conventional type which is adapted to receive an electrical signal and convert it into a proportion mechanical movement which may be recorded by means of a scribing instrument.

In FIGURE 10 is shown an example of a graphical recordation of the system in operation. Assuming that there is some leakage of light from one rod to the other, either intentionally or inherently, then there will be a minimum signal such as that indicated by the line labeled "No Ice." When the media to be detected begins forming between the detector rods, then the signal will increase until the gap between the rods has been completely filled, at which time the signal will become substantially constant, as shown by the line labeled "Ice." It is apparent that the signal may be used to indicate characteristics such as thickness, degree of transparency, purity and the like.

In FIGURE 11 there is shown a modification of the invention in cross-section similar to the view shown in FIGURE 3. In this modification the rods 80 and 82 are connected to a light source and a light sensing means. Both of the rods 80 and 82 are coated with a suitable reflecting material except for the selected areas 84 and 86. As shown in the drawing, the rods are in touching relationship at their respective uncoated areas 84 and 86. It is apparent that there will be transmission of light from the rod 80 to the rod 82 at the point of contact. It has also been found that there will be transmission at the areas immediately adjacent to the point of contact up to where the space between the two surfaces exceed two or three wave lengths through the phenomena of frustrated total reflection. When a substance, opaque to the light transmitted by the rods, forms in the areas immediately adjacent to the point of contact, part of the light that would normally be transmitted is blocked. Thus the amount of light sensed by the light-sensing means would diminish upon the formation or deposition of such an opaque media. In this manner it is possible to detect a media which is not a conductor, but rather a non-conductor of the light or any electro-magnetic energy which may be used in the system.

From the preceding description it can be seen that the subject invention may be utilized in numerous ways in addition to the detection of ice on the structural members of aircraft. For example, the system could be utilized to detect the presence of a media in a fluid, particularly one that is flowing, and could be connected to means for controlling the flow of the fluid or the media. It is also conceivable that the detector could be utilized in connection with finely pulverized solids which are flowable in character such as catalysts utilized in the cracking of hydrocarbons. Other applications will be apparent to those versed in different fields.

Although the invention has been described in terms of preferred embodiments, it is to be understood that this is merely by way of example and is not to be construed as a limitation. It is contemplated that certain modifications may be within the scope of the claims without departing from the spirit of the invention.

What is claimed is:

1. A device for detecting the presence of a light conducting medium other than the medium normally ambient to the device, comprising a pair of elongate light conveying bodies each provided with a flat light refracting surface extending for a portion of its length, means for supporting said pair of elongate light conveying bodies to maintain at least those portions of their lengths containing said flat light refracting surfaces in a closely spaced parallel relationship exposed to said normally ambient medium, a source of light positioned at one end of a first of said light conveying bodies, light sensing means positioned at one end of the second of said light conveying bodies, means positioned between said first and said second light conveying bodies for at least partially isolating from each other that portion of their lengths containing said flat light refracting surfaces, whereby said light conducting medium when placed in bridging and touching relationship between said light refracting surfaces increases the amount of light transmitted from the first of said light conveying bodies to the second of said light conveying bodies with the increased amount of light being sensed by said light sensing means.

2. A device for detecting the presence of a light conducting medium other than the medium normally ambient to the device, comprising a pair of elongate light conveying bodies each provided with a flat light refracting surface extending for a portion of its length, means for supporting said pair of light conveying bodies to maintain at least those portions of their lengths including said flat light refracting surfaces in a closely spaced parallel relationship exposed to said normally ambient medium, a source of light positioned at one end of a first of said light conveying bodies, light sensing means positioned at one end of the second of said light conveying bodies, means positioned between said first and said second light conveying bodies for at least partially isolating from each other that portion of their lengths containing said flat refracting surfaces, a coating of light reflecting substance disposed on both of said light conveying bodies on surfaces other than said light refracting surfaces and said ends, whereby said light conducting medium when placed in bridging and touching relationship between said flat light refracting surfaces increases the amount of light transmitted from the first of said bodies to the second of said bodies with the increased amount of light being sensed by said light sensing means.

3. A device for detecting the presence of a light conducting medium other than the medium normally ambient to the device, comprising a pair of elongate light conveying bodies each provided with a flat light refracting surface extending for a portion of its length, means for supporting said pair of light conveying bodies to maintain that portion of their lengths including said flat light refracting surfaces in a closely spaced parallel relationship with said flat light refracting surfaces being positioned in substantially the same plane, a source of light positioned at one end of a first of said light conveying bodies, light sensing means positioned at one end of the second of said light conveying bodies, means positioned between said first and second light conveying bodies for at least partially isolating from each other that portion of their lengths containing said flat light refracting surfaces whereby said light conducting medium when placed in bridging and touching relationship between said light refracting surfaces increases the amount of light transmitted from the first of said bodies to the second of said bodies with the increased amount of light being sensed by said light sensing means.

4. A device for detecting the presence of a light conducting medium other than the medium normally ambient to the device, comprising a pair of elongate light conveying bodies each provided with a flat light refracting surface extending for a portion of its length, means for supporting said pair of light conveying bodies to maintain that portion of their lengths having said flat light refracting surfaces in a closely spaced relationship with said flat surfaces being positioned in substantially the same plane, a source of light positioned at one end of a first of said light conveying bodies, light sensing means positioned at one end of the second of said light conveying bodies, barrier means positioned between said light conveying bodies and extending above said plane of said light refracting surfaces for at least partially isolating the light refracting surface of said second body from the light refracting surface of said first body whereby said light conducting medium when placed in bridging and touching relationship between said light refracting bodies increases the amount of light transmitted from the first of said bodies to the second of said bodies with the increased amount of light being sensed by said light sensing means.

5. A device for detecting the presence of a light conducting medium other than the medium normally ambient to the device, comprising first and second elongate light conveying bodies with said first body being provided with a flat light refracting surface extending for a portion of its length, means for supporting said pair of light conveying bodies in a closely spaced coaxial relationship for at least a portion of their lengths and having their coaxial ends exposed to said ambient medium, a source of light positioned at one end of said first body, light sensing means positioned at one end of said second body, said first body having a first light refracting surface extending for a portion of its length, said light conveying bodies having their coaxial ends cut at supplementary angles to each other with said coaxial ends providing light refracting surfaces in the presence of the light conducting medium and being positioned in a closely spaced relationship, the angle of the coaxial end of said first body being selected to cause substantially all of the light transmitted through said first body to said coaxial end to be reflected through said first refracting surface in the presence of the ambient medium and in the presence of said light conducting medium to be refracted through said angled end surface to impinge upon the closely spaced end surface of said second body whereby said light conducting medium when placed in bridging relationship between the coaxial ends of said light conveying bodies increases the amount of light transmitted from said first body to said second body with the increased amount of light being sensed by said light sensing means.

6. A device for detecting the formation of ice in a medium, such as air, normally ambient to the device wherein ice has an index of refraction substantially greater than said medium, comprising a pair of elongate light conveying bodies each provided with a light refracting surface extending for a portion of its length, means for supporting said light conveying bodies to maintain at least those portions of their lengths including said light refracting surfaces in a closely spaced parallel relationship exposed to said ambient medium, a source of light positioned at one end of a first of said light conveying bodies, light sensing means positioned at one end of a second of said light conveying bodies, means positioned between said first and second light conveying bodies for at least partially isolating said light refracting surfaces from each other whereby said ice when placed in bridging and touching relationship with said refracting surfaces, due to its greater index of refraction causes a corresponding increase in the critical angle so that the amount of light refracted from said first light conveying body through its associated refracting surface is increased, said ice transmitting at least a portion of the light of the refracted light to the second of said light conveying bodies through the associated refracting surface.

7. A device for detecting the formation of ice in a medium, such as air, normally ambient to the device wherein the ice has a greater index of refraction than said medium, comprising a pair of elongate light conveying bodies each provided with a flat light refracting surface extending for a portion of its length, means for supporting said pair of light conveying bodies to maintain at least those portions of their lengths containing said flat light refracting surfaces in a closely spaced parallel relationship exposed to said ambient medium, a source of light positioned at one end of a first of said light conveying bodies, light sensing means positioned at one end of the second of said light conveying bodies, means positioned between said first and said second light conveying bodies for at least partially isolating from each other that portion of their lengths containing said flat refracting surfaces, whereby said ice when placed in bridging and touching relationship with said refracting surfaces, due to its greater index of refraction causes a corresponding increase in the critical angle so that the amount of light refracted from said first light conveying body through its associated refracting surface is increased, said ice transmitting at least a portion of the refracted light to the second of said light conveying bodies through the associated light refracting surface.

8. A device for detecting the formation of ice in a medium, such as air, normally ambient to the device wherein the ice has an index of refraction greater than that of the ambient medium, comprising a pair of elongate light conveying bodies each provided with a flat light refracting surface extending for a portion of its length, means for supporting said pair of light conveying bodies to maintain those portions of their lengths having said flat light refracting surfaces in a closely spaced parallel relationship with said flat surfaces in substantially the same plane, a source of light positioned at one end of the first of said light conveying bodies, light sensing means positioned at one end of the second of said light conveying bodies, barrier means positioned between said light conveying bodies and extending about the plane of said light refracting surfaces for at least partially isolating the light refracting surface of said second body from the light emitted from the light refracting surface of said first body whereby said ice when placed in bridging and touching relationship with said flat light refracting surfaces, due to its greater index of refraction, causes a corresponding increase in the critical angle so that the amount of light refracted from said first light conveying body through its associated flat light refracting surface is increased, said ice transmitting at least a portion of the refracted light to the second of said light conveying bodies through its associated light refracting surface.

9. A device for detecting the formation of ice in a medium, such as air, normally ambient to the device wherein the ice has an index of refraction greater than that of the ambient medium, comprising a pair of elongate light conveying bodies arranged in a closely spaced coaxial end to end relationship and having their coaxial ends exposed to said ambient medium, a source of light positioned at the other end of the first of said light conveying bodies, light sensing means positioned at the other end of the second of said light conveying bodies, said first light conveying body having a light refracting surface extending for a portion of its length adjacent to the coaxial end thereof, said light conveying bodies having their coaxial ends cut at supplementary angles to each other with the angle of the end of said first light conveying body being selected so that in the presence of said ambient medium substantially all of the light transmitted through said first light conveying body strikes the angled end surface thereof at an angle greater than the critical angle so as to be reflected toward said light refracting surface and thus be refracted therefrom, and in the presence of ice due to its greater index of refraction and the correspondingly greater critical angle to be refracted through said angled end surface of said first light conveying body, whereby ice when in bridging and touching relationship between said coaxial ends of said light conveying bodies transmits the light refracted from said first light conveying body to said second light conveying body with the increased amount of light being sensed by said light sensing means.

10. An ice detecting means comprising, a pair of light conveying bodies, means for supporting said pair of light conveying bodies to maintain portions of their lengths in a closely spaced relationship, a source of light having a predetermined regularly varying intensity positioned at one end of the first of said light conveying bodies, light sensing means positioned at one end of the second of said light conveying bodies for generating an electrical signal having a characteristic varying in accordance with the light emitted from said light source, means for partially isolating said second light conveying body from the light associated with said first light conveying body over that portion of their lengths maintained in a closely spaced relationship, direct current filtering means connected to said light sensing means for removing any direct current signal generated therein, demodulator means connected to said direct current filtering means for providing a demodulated signal and for removing the signal component comprising the said predetermined frequency with which said source of light has its intensity varied, and means for receiving and indicating the magnitude of said demodulated signal whereby the modulating effect of ice in a bridging relationship between said rods may be indicated.

References Cited in the file of this patent

UNITED STATES PATENTS

| | | |
|---|---|---|
| 2,229,451 | Gullicksen | Jan. 21, 1941 |
| 2,256,595 | Metcalf | Sept. 23, 1941 |
| 2,371,259 | Patterson | Mar. 13, 1945 |
| 2,476,217 | Pond | July 12, 1949 |
| 2,499,996 | Kelsey | Mar. 7, 1950 |
| 2,695,964 | Schepker | Nov. 30, 1954 |
| 2,892,950 | Sadowsky | June 30, 1959 |